(12) United States Patent
Minegishi

(10) Patent No.: US 7,410,439 B2
(45) Date of Patent: Aug. 12, 2008

(54) REDUCER

(75) Inventor: Kiyoji Minegishi, Aichi (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/892,284

(22) Filed: Jul. 16, 2004

(65) Prior Publication Data

US 2005/0014595 A1 Jan. 20, 2005

(30) Foreign Application Priority Data

Jul. 16, 2003 (JP) ............................ 2003-275355

(51) Int. Cl.
*F16H 1/32* (2006.01)
(52) U.S. Cl. ...................... 475/168; 475/170
(58) Field of Classification Search ................ 475/168, 475/169, 170, 178
See application file for complete search history.

(56) References Cited

U.S. PATENT DOCUMENTS

| | | | | |
|---|---|---|---|---|
| 3,807,697 A | * | 4/1974 | Cotreau et al. ............... 254/276 |
| 4,819,975 A | * | 4/1989 | Morishita et al. ............. 290/48 |
| 4,909,102 A | * | 3/1990 | Haga ........................... 475/168 |
| 5,203,748 A | * | 4/1993 | Sawada et al. ............... 475/183 |
| 5,683,323 A | * | 11/1997 | Imase ........................ 475/168 |
| 5,931,212 A | * | 8/1999 | Mullet et al. ................ 160/188 |

FOREIGN PATENT DOCUMENTS

| | | | | |
|---|---|---|---|---|
| JP | 48-9867 | | 2/1973 | |
| JP | 53-116580 | | 9/1978 | |
| JP | 61-262260 A | | 11/1986 | |
| JP | 3-9148 | * | 1/1991 | ................. 475/168 |
| JP | 07-119800 | | 5/1995 | |
| JP | 11-193852 | | 7/1999 | |
| JP | 2001-232516 | | 8/2001 | |

* cited by examiner

*Primary Examiner*—Ha D. Ho
(74) *Attorney, Agent, or Firm*—Squire Sanders & Dempsey L.L.P.

(57) ABSTRACT

A reducer having an inner gearing planetary gear speed reduction mechanism is provided, which costs low and can be easily installed. A driving device is provided with a planetary gear speed reduction mechanism having an internal gear and an external gear which internally meshes with the internal gear. The planetary gear speed reduction mechanism makes one of the internal gear and the external gear (the external gear in the drawing) rotate on its axis with an oscillating movement in accordance with a rotation of an input shaft.

13 Claims, 7 Drawing Sheets

REDUCER

BACKGROUND OF THE INVENTION

1. Field of the Invention

The present invention relates to a reducer, and especially relates to a reducer which is provided with a planetary gear speed reduction mechanism. The planetary gear speed reduction mechanism, having an internal gear, an external gear which internally meshes with the internal gear, and a swing body which makes one of the internal and external gears oscillatingly rotate on its axis in accordance with a rotation of an input shaft.

2. Description of the Related Art

When a certain speed reduction ratio is required with respect to rotational speed of a motor, doubly or triply stacking speed reduction stages with a low speed reduction ratio causes lack of miniaturization. A speed reducer having a planetary gear speed reduction mechanism is known as a conventional speed reduction mechanism which can obtain a high speed reduction ratio by a single stage. In the planetary gear speed reduction mechanism, an external gear internally meshes with an internal gear. The speed reducer with the planetary gear speed reduction mechanism is used in many cases or in many apparatuses.

FIG. 8 shows an example of this type of planetary gear speed reducer, which is disclosed in Japanese Patent Laid-Open This planetary gear speed reducer G is provided with an input shaft (a first shaft) 1, an eccentric body (swing body) 3, an external gear 5, an internal gear 10, and an output shaft 2. Motive power is inputted from a motor 20 into the input shaft 1. The eccentric body 3 is rotated by a rotation of the input shaft 1. The external gear 5 is installed to oscillatingly rotate with respect to the input shaft 1 through the eccentric body 3. The external gear 5 internally meshes with the internal gear 10. The output shaft 2 is coupled to the external gear 5 in such a manner as to transmit only a rotational component thereof. The external gear 5, as shown in FIG. 9, is fitted on the eccentric body 3 with play by a bearing hole 5a formed in the center of itself. An inner ring 3a (of the bearing) is provided on the outer periphery of the eccentric body 3. Bearing rollers 4 are directly inserted between the inner ring 3a and the bearing hole 5a. Furthermore, a plurality of inner roller holes 6 are formed in the external gear 5 in a circumferential direction. An inner pin 7 and an inner roller 8 are fitted into each of the inner roller holes 6 with play. External teeth 9 in the shape of a trochoid or an arc, which are formed in the outer periphery of the external gear 5, are engaged with the inside of the internal gear 10.

The inner roller 8 is rotatably held by the inner pin 7. The base portion of the inner pin 7 is fixedly fitted into a carrier 14 which is integrated with the output shaft 2. The internal gear 10 also serves as a part of a casing 12, and internal teeth of the internal gear 10 are structured by outer pins 11. The output shaft 1 is firmly supported by two large bearings 16 and 18 so that the center of the shaft is not misaligned.

When the input shaft 1 performs a single rotation, the eccentric body 3 performs a single rotation in accordance therewith. The external gear 5 also tries to rotate in accordance with the rotation of the eccentric body 3, but engagement with the internal gear 10 restricts free rotation of the external gear 5 on its axis. Thus, the external gear 5 almost only oscillates with engaging with the internal gear 10 (with slight rotation on its axis).

Taking a case that the number of the teeth of the external gear 5 is represented by N, and the number of the teeth of the internal gear 10 is represented by N+1, difference between the numbers of the teeth is 1. Therefore, whenever the input shaft 1 performs a single rotation (in other words, the external gear 5 oscillates one time), the external gear 5 deviates with respect to the internal gear 10 by a single tooth (slightly rotates on its axis). This means that the external gear 5 rotates on its axis at a speed of $-1/N$ times the speed of the rotation of the first shaft 1 (a minus represents reverse rotation).

Of movement of the external gear 5 like this (oscillation with slow rotation on its axis), an oscillating component is absorbed by clearance between the inner roller holes 6 and the inner rollers 8, and only a rotational component is transmitted to the output shaft 2. As a result, speed reduction at a speed reduction ratio of $-1/N$ is achieved between the input shaft 1 and the output shaft 2.

As other speed reduction mechanisms in which an external gear internally meshes with an internal gear, are known an inner gearing planetary gear speed reduction mechanism of an internal gear oscillation type in which an internal gear oscillatingly rotates about a fixed external gear, a planetary gear mechanism of a distortion engagement type in which a deformable external gear is inscribed in an internal gear with flexure, and the like.

FIG. 10A is a sectional view of a conventional planetary gear speed reducer of a distortion engagement type, which is disclosed in Japanese Patent Laid-Open Publication No. 11-193852. FIG. 10B is a side view of a wave generator in the planetary gear speed reducer. This planetary gear speed reducer G2 of the distortion engagement type has a ring-shaped rigid internal gear 22, a cup-shaped flexible external gear 23 disposed inside the rigid internal gear 22, and a wave generator (swing body) 24 fitted into the inside of the distortable external gear 23. An outline of the wave generator 24 takes the shape of an ellipse. Internal teeth 22a are formed in the inner periphery of the rigid internal gear 22. The cup-shaped flexible external gear 23 is provided with a cylindrical barrel 23a, a ring-shaped diaphragm 23b closing one end of the barrel 23a, a ring-shaped boss 23c continued from an inner peripheral edge of the diaphragm 23b, and external teeth 23d formed in the outer periphery of an open end of the barrel 23a. The external teeth 23d are engageable with the internal teeth 22a. The number of the external teeth 23d is generally less than that of the internal teeth 22a by two.

The wave generator 24 elliptically distorts the flexible external gear 23, so that the external teeth 23d of the flexible external gear 23 are engaged with the internal teeth 22a of the rigid internal gear 22 at two points. Since engagement portions are moved in a circumferential direction, relative rotation occurs between the flexible external gear 23 and the rigid internal gear 22 in accordance with difference between the number of the external teeth 23d and the number of the internal teeth 22a. Generally, an input shaft (the first shaft: not illustrated) is coupled to the wave generator 24, and the rigid internal gear 22 is fixed on the wave generator 24. An output shaft (not illustrated) supported by a bearing (not illustrated) is coupled to the boss 23c of the flexible external gear 23. Thus, it is possible to take out rotation with reduced speed via the output shaft supported by the bearing (refer to, for example, Japanese Patent Laid-Open Publication No. 7-119800 and other articles). The principle of speed reduction is basically the same as that of the foregoing inner gearing planetary gear mechanism.

The reducers having these planetary gear speed reduction mechanisms have the common advantage of obtaining a large speed reduction ratio in a single stage. Any of the reducers, however, needs an additional mechanism for absorbing an oscillating component or a distortion component, because the external gear or the internal gear rotates (rotates on its axis) with oscillation or distortion. Also, the output shaft of the reducer is supported by the bearing in such a manner as not to deviate the center of the shaft, in order to take out only the rotational component.

To absorb the oscillating component in the inner gearing planetary gear speed reduction mechanism, as described above, a method of fitting the inner pins into the inner pin holes with play is adopted in general. In addition, when an Oldham coupling is provided or there is spatial room in an axial direction, a structure of combination of the so-called dog bone and a universal joint may be adopted.

In the case of the planetary gear speed reduction mechanism of the distortion engagement type, as has been already described too, a method of extending the external gear in an axial direction in a tubular shape and absorbing the distortion component by an extended portion is often used. Therefore, the external gear of the distortion engagement type planetary gear mechanism is generally made of a material which has flexibility and high strength.

The reducers having these planetary gear speed reduction mechanisms, however, have the following problems.

First, there is a problem that the mechanism for absorbing the oscillating component or the distortion component requires extremely high accuracy in processing or preparation of expensive material, so that manufacturing cost of the whole device becomes high.

Second, the oscillating component or the distortion component is absorbed along the axial direction of the input shaft (the first shaft), and motive power is outputted from the output shaft coaxial with the input shaft, so that the axial length of the device tends to be long.

Third, obtaining the high speed reduction ratio in the single stage is a big advantage, but, in other words, this means that the heavy output shaft has to be supported with accurately maintaining coaxiality with the first shaft. Thus, the cost for supporting the output shaft and its peripherals, including manufacturing and assembling cost of the bearing and the like, tends to be high, and hence it becomes a large cause of increasing cost of the whole drive device.

Fourth, since the whole drive device becomes heavy in weight, the drive device is inconvenient to handle. Also it is necessary to secure strength in structure of a host machine to support the heavy drive device.

SUMMARY OF THE INVENTION

The present invention has been achieved to solve the conventional problems as described above. An object of the present invention is to provide a reducer having a planetary gear speed reduction mechanism of an inner gearing type, which costs low and is easily installable.

To solve the foregoing problems, a reducer according to the present invention comprises a casing, an input shaft, and a planetary gear speed reduction mechanism. The casing contains the input shaft and the planetary gear speed reduction mechanism. The planetary gear speed reduction mechanism has an internal gear, an external gear which internally meshes with the internal gear, and a swing body. The swing body makes one of the internal and external gears rotate on its axis with an oscillating movement in accordance with the rotation of the input shaft. The one of the gears or a member integrated therewith serves as an output shaft.

To solve the foregoing problems, a reducer according to the present invention comprises a casing, a first shaft, and a planetary gear speed reduction mechanism. The casing contains the first shaft and the planetary gear speed reduction mechanism. The planetary gear speed reduction mechanism has an internal gear, an external gear which internally meshes with the internal gear, and a swing body. The swing body makes one of the internal and external gears rotate on its axis with an oscillating movement in accordance with the rotation of the first shaft. The reducer further comprises a second shaft and a transmission. The second shaft is disposed outside of the casing in parallel with the first shaft. The transmission is disposed between the one of the gears and the second shaft, in order to transmit a rotating movement of the one of the gears to the side of the second shaft while absorbing the oscillating movement of the one of the gears.

To solve the foregoing problems, a reducer according to the present invention comprises a casing, a first shaft, a planetary gear speed reduction mechanism, a second shaft, and a transmission. The casing contains the first shaft, the planetary gear speed reduction mechanism, the second shaft, and the transmission. The planetary gear speed reduction mechanism has an internal gear, an external gear which internally meshes with the internal gear, and a swing body. The swing body makes one of the internal and external gears rotate on its axis with an oscillating movement in accordance with a rotation of the first shaft. The second shaft is disposed in parallel with the first shaft. The transmission is disposed between the one of the gears and the second shaft, in order to transmit a rotating movement of the one of the gears to the second shaft while absorbing the oscillating movement of the one of the gears.

In the present invention, the conventional structure which is naturally adopted in a reducer having this type of planetary gear speed reduction mechanism, is abandoned on purpose. That is, the structure in which "a component of a oscillating movement of an internal gear or an external gear is absorbed in an axial direction, and rotation is taken out of an output shaft without the oscillating component" is abandoned. Incidentally, in the case of a planetary gear speed reduction mechanism of a distortion engagement type, the component of the oscillating movement means a component of a distorting movement. Both concepts are collectively represented hereinafter by the oscillating movement or the oscillating component. Thus, according to the present invention, rotation including the oscillating component is taken but directly in a direction orthogonal to the center of an axle. The oscillating component is absorbed by the function of the transmission means during this take-out processing.

Namely, focusing attention on a direction of absorbing the oscillating component, the oscillating component has been conventionally absorbed in a direction coaxial with the input shaft (or the first shaft), namely, rotation the oscillating component of which has been absorbed is taken in a direction coaxial with the input shaft. According to the present invention, the oscillating component is absorbed in a plane orthogonal to the shaft (the oscillating component is absorbed during the process of taking out motive power in the direction orthogonal to the input shaft) In other words, axial space, which has been necessary for absorbing the oscillating component in the conventional planetary gear speed reduction mechanism, becomes unnecessary in the present invention.

According to the present invention, since the oscillating component is not absorbed in the axial direction, it is possible to omit high-cost factors for absorbing the oscillating component, which has been considered to be unavoidable in the manufacture of this type of conventional planetary gear speed reduction mechanisms. Therefore, it is possible to realize cost reduction.

Since the axial dimension of the device is shortened, it is possible to increase a degree of flexibility in installing the reducer.

The output shaft to be supported with high accuracy becomes unnecessary, and the second shaft does not require support with high accuracy. As a result, it is possible to reduce the cost for supporting the output shaft and its peripherals.

Besides, the reducer according to the present invention can have original function of this type of planetary gear speed reduction mechanism, that is, the function of obtaining a high speed reduction ratio in a single stage.

DETAILED DESCRIPTION OF THE PREFERRED EMBODIMENTS

Embodiments of the present invention will be hereinafter described in detail with reference to the drawings.

Figure 1:
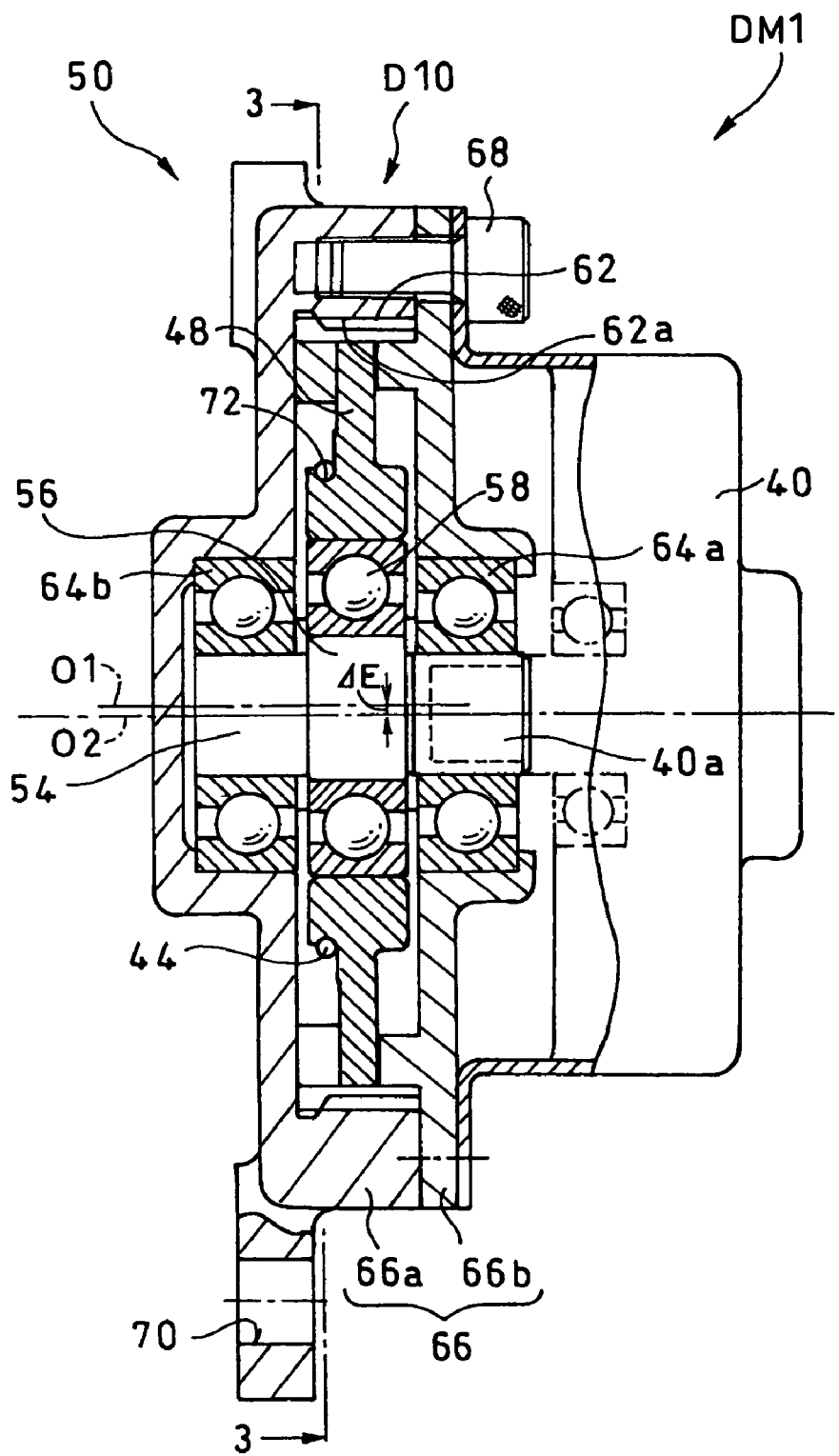
FIG. 1 is a sectional view (enlarged) of a speed reducing section in a driving device for a slidable member, to which the present invention is applied.
Figure 2:
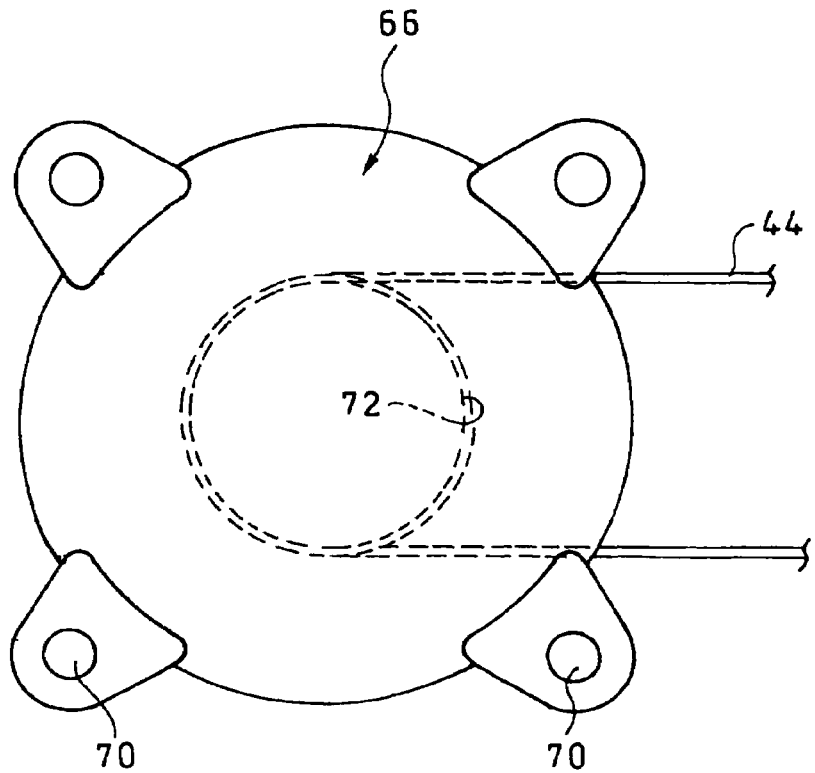
FIG. 2 is a left side view of the speed reducing section.
Figure 3:
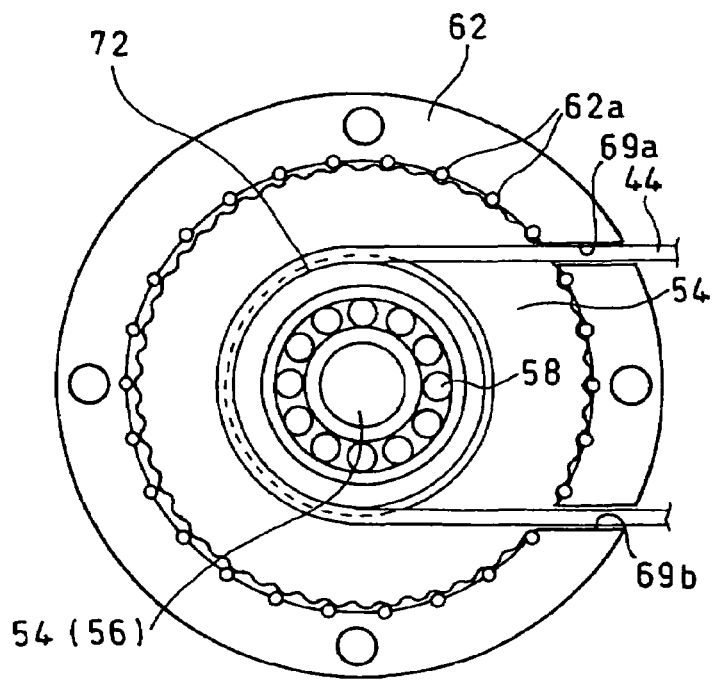
FIG. 3 is a sectional view taken along the line 3-3 in FIG. 1.
Figure 4:
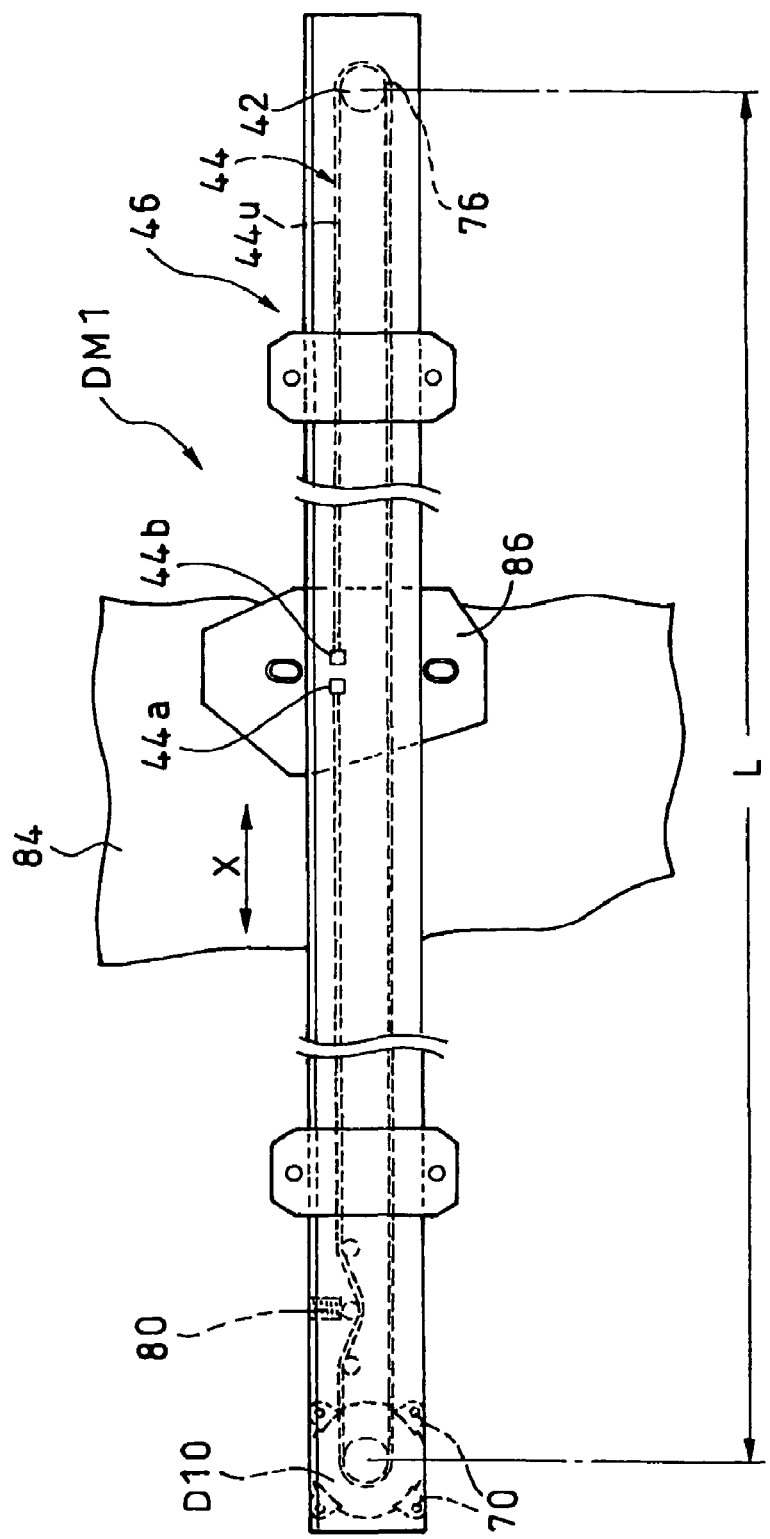
FIG. 4 is a side view showing an example of structure, in which the foregoing driving device is concretely applied to driving of an automatic door for a building.

FIG. 1 is a sectional view (enlarged) of a speed reducing section in a reducer for driving a slide member, to which the present invention is applied. FIG. 2 is a left side view of the speed reducing section. FIG. 3 is a sectional view taken along the line 3-3 in FIG. 1. FIG. 4 is a side view showing an example of structure, in which the reducer is concretely applied to driving an automatic door for a building.

This reducer DM1 comprises a planetary gear speed reducer D10 which receives rotation of a motor (external drive source) 40 through an input shaft (a first shaft) 54 and reduces the speed of the rotation, an end shaft (a second shaft) 42, and transmission means 46 including a wire (strip-shaped transmission member) 44. The so-called flat motor is used as the motor 40 in order to shorten the axial length of the device.

The planetary gear speed reducer D10 has the so-called inner gearing planetary gear speed reduction mechanism 50 of an external gear oscillation type, in which an external gear 48 oscillates and rotates on its axis. The inner gearing planetary gear speed reduction mechanism 50 mainly comprises the input shaft 54, an eccentric body (swing body) 56, the external gear 48, and an internal gear 62. The input shaft 54 is coupled to a motor shaft 40a of the motor 40. The eccentric body 54 is formed integrally with the input shaft 54, and the center O1 of an axle of the eccentric body 56 is eccentric by ΔE with respect to the center O2 of the input shaft 54. The external gear 48 is installed oscillatably and rotatably about the eccentric body 56 via a bearing 58. The external gear 48 internally meshes with the internal gear 62.

The input shaft 54 and the planetary gear speed reduction mechanism 50 are supported by a casing 66 through bearings 64a and 64b. The casing 66 comprises a main body 66a and a cover 66b, which are coupled with a bolt 68. The internal gear 62 is integrated with the main body 66a of the casing 66. In the main body 66a, through holes 69a and 69b, through which the wire 44 is drawn, are formed along a plane orthogonal to the center O1 of an axle of the external gear 48 or the center O2 of the input shaft 54. The reference numeral 70 in the drawings denotes an attachment hole for fixing the casing 66 (together with the motor M10) on a main body (a structure on the side of a host machine) of a not-illustrated automatic door.

Structure such as inner pin holes and the like, which is conventionally formed to absorb an oscillating component, is entirely omitted in the external gear 48. A driving groove section 72 is integrally formed in the side face of the external gear 48 instead. The wire 44 as the transmission means 46 is wound in the driving groove section 72, in order to take out a rotational component of the external gear 48 (in a state where an oscillating component is included).

In this embodiment, the number of teeth of the external gear 48 is fifty-one, and the substantial number of teeth of the internal gear 62 is fifty-two which is double the number of pins 62a, namely twenty-six. Thus, difference in numbers of the teeth is set at one. The number of the pins 62a is set at twenty-six (half), because the interfering pins 62a are thinned out to contain the wire 44 in the axial width of the external gear 48 (to contain the through holes 69a and 69b, being outlets of the wire 44 from the main body 66a of the casing 66, in the width of the internal gear 62). The through holes 69a and 69b are formed in this thinned out space. In a case where the driving groove section 72 is provided outside of the axial width of the internal gear 62, it is not always necessary to thin out the pins 62a.

The transmission means 46, as shown in FIG. 4, mainly comprises the driving groove section 72 formed in the external gear 48, a driven groove section 76 formed on the periphery of the end shaft 42, and the wire 44 wound between the driving groove section 72 and the driven groove section 76. The wire 44 is provided with a spring mechanism (tension adjustment mechanism) 80 for adjusting tension of the wire 44. Thus, constant tension is always secured, even if the external gear 48 oscillates to move the center O1 of an axle of the driving groove section 72 (=the center of the axles of the external gear 48 and the eccentric body 56) so that the center distance L between the driving groove section 72 and the driven groove section 76 varies, or, even if the pitch radius of the input shaft 54 with respect to the center O2 of the shaft varies so that a similar state in which the center distance is substantially varied is formed.

This reducer DM1 is attached to a pillar or the like on the side of a not-illustrated car body via the attachment hole 70, together with the motor 40 and the planetary gear speed reducer D10.

An automatic door (slidable member) 84 is slidable along a guide rail (a structure: not illustrated) on the side of the host machine (a main body of an automatic door device). The automatic door is provided with a base 86, on which ends 44a and 44b of the wire 44 are fixed. The automatic door 84 is configured so as to be driven in an X direction in the drawing, in conjunction with movement of one side (upper side in the drawing) 44u of the wire 44. Then, the operation of the reducer DM1 will be described.

When the motor shaft 40a of the motor 40 rotates, the input shaft (the first shaft) 54 rotates at the same speed. When the input shaft 54 rotates, the eccentric body 56 integrally formed with the input shaft 54 rotates. Thus, the center O1 of the axle of the external gear 48, the external gear 48 being fitted on the outer periphery of the eccentric body 56 through the bearings 58, moves on the circumference of a circle (carries out oscillation), the radius of which corresponds to an amount of eccentricity ΔE. As a result, an engagement position between the external gear 48 and the internal gear 62 successively moves. When the input shaft 54 performs a single rotation, the external gear 48 is out of phase (rotates on its axis) by difference in the number of teeth between the external gear 48 and the internal gear 62 (in this embodiment, 52−51=1). This means that the single rotation of the input shaft 54 is reduced to a −1/51 rotation of the external gear 48. A minus sign represents that a direction of rotation of the external gear 48 is opposite to a direction of a rotation of the input shaft 54.

Movement of the external gear 48 including an oscillating component and a rotational component is taken out in a direction orthogonal to the input shaft 54 through the wire 44 wound in the driving groove section 72. The oscillating component caused by the amount of eccentricity ΔE of the external gear 48 appears as variation (ΔE×2) in the center distance L between the driving groove section 72 in the external gear 48 and the driven groove section 76 in the end shaft 42. The amount of eccentricity ΔE, however, is little so as to be insignificant as compared with the center distance L. Thus, this variation is completely absorbed by the distortion of the wire 44, and the spring mechanism 80 for tension adjustment which is provided adjacently to the wire 44. As a result, the wire 44 rotates while following the movement of the rotational component of the external gear 48, so that the automatic door 84 can slide between the planetary gear speed reducer D10 and the end shaft 42 in an extremely smooth manner.

Since the planetary gear speed reducer D10 basically has the inner gearing planetary gear speed reduction mechanism 50 of the external gear oscillation type, it is possible to realize speed reduction by a large speed reduction ratio in a single stage. Furthermore, since the motor 40 is a flat motor which is short in the axial direction, the planetary gear reducer is made compact with the high speed reduction ratio. Especially, axial space, which has been necessary for absorbing the oscillating component, becomes unnecessary, so that the planetary gear reducer according to this embodiment is short in the axial direction as compared with this type of conventional planetary gear reducers. In this planetary gear speed reduction mechanism 50 of the external gear oscillation type, as described in the foregoing embodiment, the eccentric body (swing body) 56 disposed on the outer periphery of the input shaft 54 oscillates the external gear 48. Therefore, it is possible to simplify the "structure for making oscillation."

Furthermore, since the wire 44 serving as the transmission means 46 absorbs the oscillating component, it becomes completely unnecessary to manufacture the conventional "unavoidable structure" in this type of planetary gear reducer, such as a plurality of inner roller holes (6) for absorbing the oscillating component and a flange section (14) for holding a plurality of inner pins (7) and inner rollers (8), which are fitted into the inner roller holes (6) with play, in predetermined positions. Thus, it becomes possible to manufacture both of the external gear 48 and the internal gear 62 by adopting the most basic method for manufacturing a gear. Also, accurate support for the output shaft (2) becomes unnecessary. Therefore, it is possible to drastically reduce manufacturing cost of the planetary gear reducer D10.

The planetary gear reducer D10 does not need a conventional large and heavy output shaft (2). Thus, the planetary gear reducer D10 with the motor 40 becomes light in weight, and hence the reducer DM1 becomes easy to handle. Furthermore, the reducer DM10 is supported by the host machine at dispersed plural points such as the planetary gear reducer D10, the end shaft 42 and the like, so that it is possible to drastically simplify reinforcement structure on the side of the host machine in a portion, on which the reducer DM1 is attached.

Figure 5:
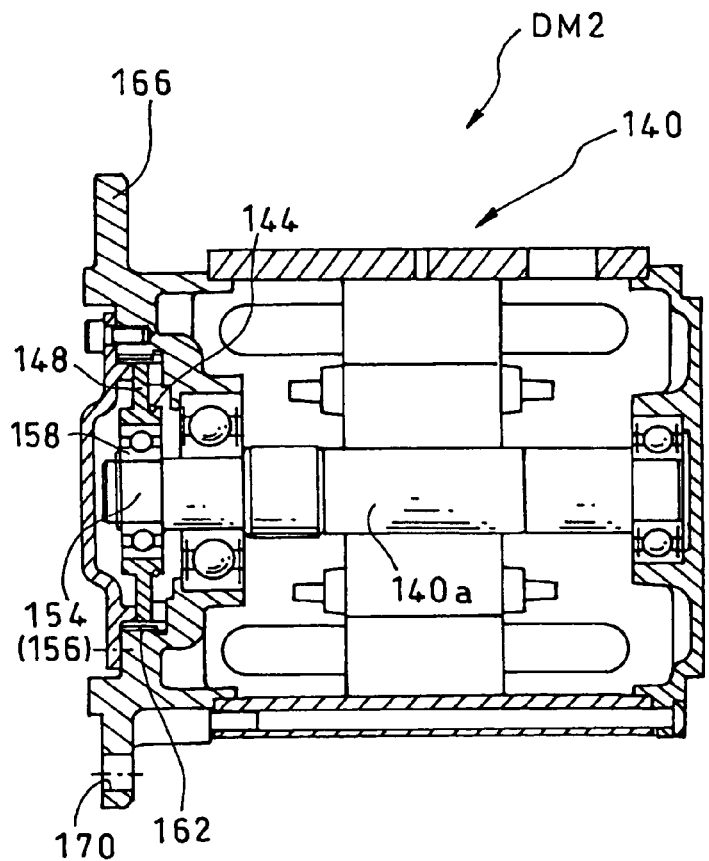
FIG. 5 is a sectional view corresponding to FIG. 1 showing a reducer according to an embodiment, of the present invention, used with a general induction motor in combination.
Figure 6:
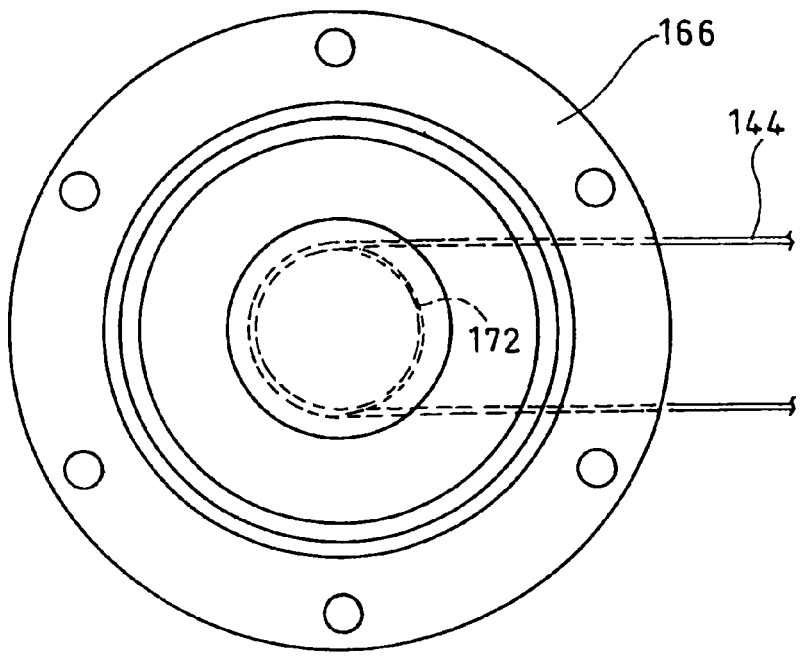
FIG. 6 is a left side view of the reducer.

FIGS. 5 and 6 show an embodiment in which the reducer according to the present invention is combined with an induction motor.

A motor shaft 140a of an induction motor 140 also serves as an input shaft 154 of a reducer DM2. Since the other configuration is the same as that of the foregoing embodiment, the reference numerals the lower two digits of which are the same as those of the foregoing embodiment refer to identical or similar parts in the drawings, and duplicate explanation is omitted. The big advantage of the reducer DM2 according to this embodiment is its extremely low cost.

Figure 7:
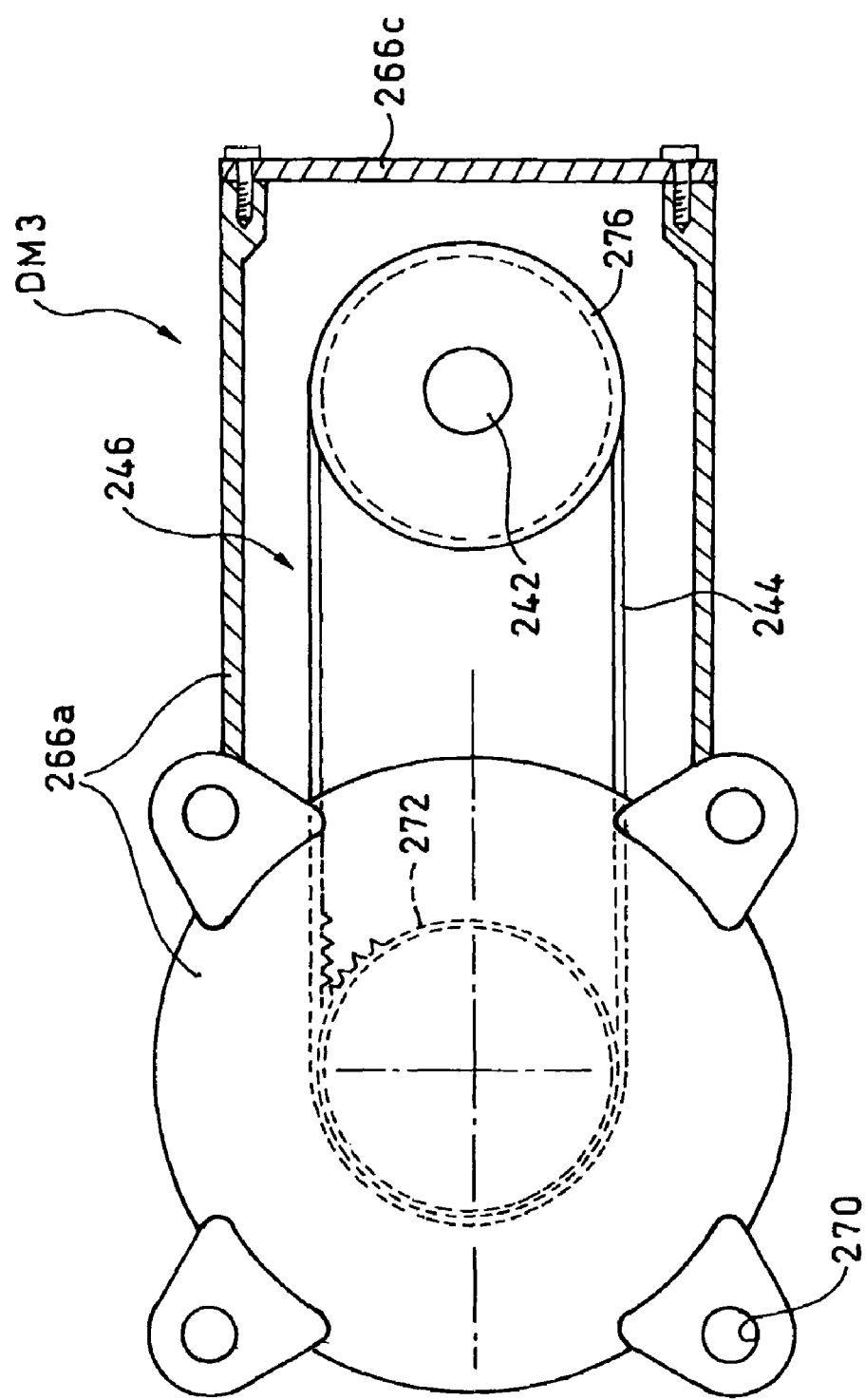
FIG. 7 is a partly cutaway side view showing another embodiment, in which the present invention is applied to a planetary gear reducer.
Figure 8:
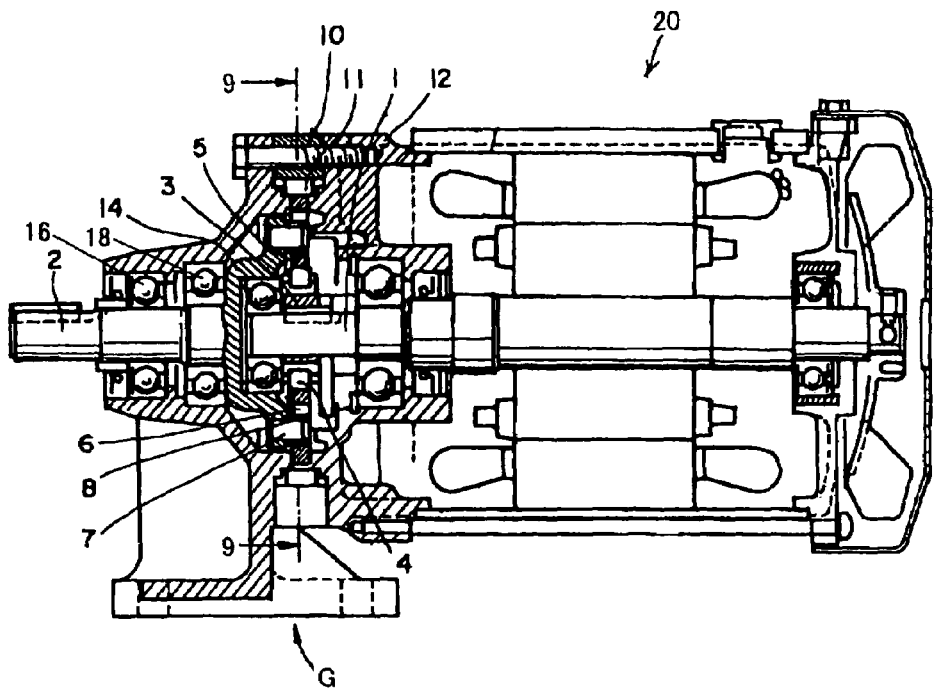
FIG. 8 is a sectional view showing an example of structure of a conventional inner gearing planetary gear reducer of an external gear oscillation type.
Figure 9:
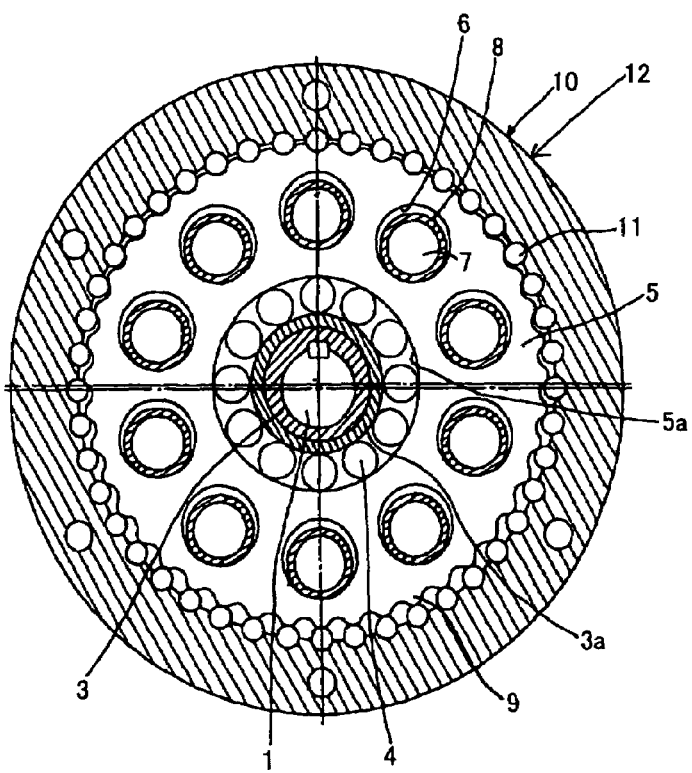
FIG. 9 is a sectional view taken along the line 9-9 in FIG. 8.
Figure 10:
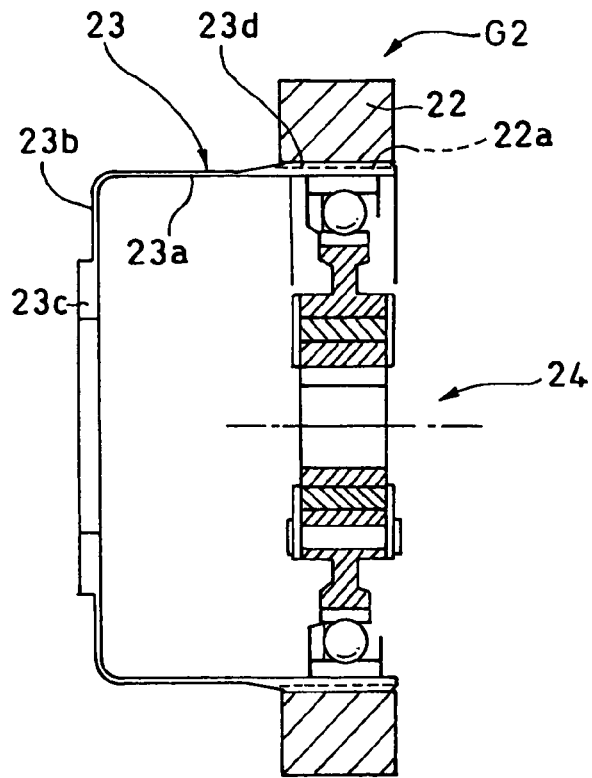
FIG. 10A is a sectional view showing an example of structure of a conventional inner gearing planetary gear reducer of a distortion engagement type and FIG. 10B is a wave generator therein.
Figure 10:
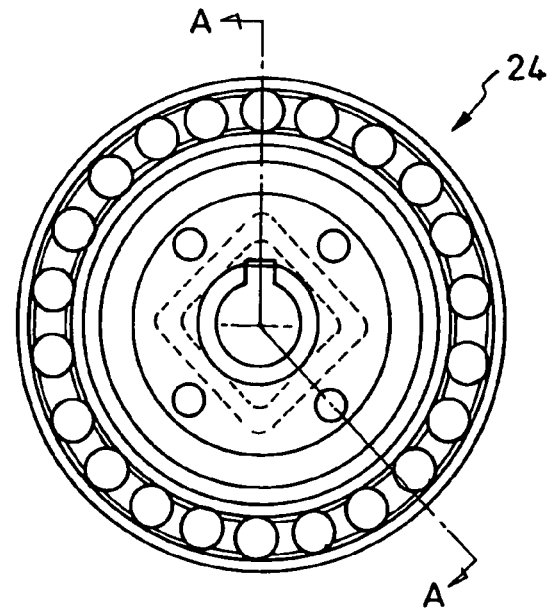

FIG. 7 shows a reducer DM3 being an independent reducer, in which all members including transmission means and the second shaft are contained in a main body 266a of a casing (266), and a casing cover 266c is fitted thereon. The combination of a driven sprocket 272 with teeth, a belt (strip-shaped transmission member) 244 with teeth, and a driven sprocket 276 with teeth is adopted as the transmission means 246.

This reducer DM3 can be used as the independent so-called inner gearing planetary gear speed reducer, and a rotation of an output shaft (the second shaft) 242 does not include an oscillating component. The oscillating component, however, is taken out in a direction orthogonal to an input shaft (not illustrated), so that it is possible to prevent increase in the size of the device in the axial direction. The reducer also has an effect specific to the present invention, such as low cost due to unnecessity of sophisticated structure for absorbing the oscillating component (unnecessity of a spring mechanism for adjusting tension) and the like. The other structure is the same as that of the foregoing embodiment, the reference numerals the lower two digits of which are the same as those of the foregoing embodiment refer to identical or similar parts in the drawing, and duplicate explanation thereof is omitted. The output shaft (the second shaft) 242 may not serve as a final output shaft, and a speed reduction stage may be further added after the second shaft.

The present invention has various variations in addition to the above.

For example, an application is not limited to the drive of the automatic door (the slidable member), but the present invention can be applied to every reducer which has an inner gearing type planetary gear speed reduction mechanism. Similar structure is applicable to, for example, a device for opening and closing various slide doors, a device for moving trays of a multilevel parking garage up and down, a device for driving a carrier of a belt conveyer, a device for moving up and down or opening and closing an automatic curtain, an automatic shutter and the like, a device for driving various slide members such as office automation equipment, a household electrical appliance and the like, a device for driving joints of an industrial robot and the like, in addition to the automatic door of the building.

In the foregoing embodiment, driving force for the slidable member (slide door 84) is directly taken out of the movement of the wire 44 serving as the transmission means 46. In a case where the second shaft (end shaft 42) is actively rotated, the slidable member may be driven by an additional driving belt (not illustrated) or the like with the use of this rotation. In this case, the second shaft rotates in a state where the oscillating component has been completely removed, so that the oscillating component is not transmitted to the driving belt. Therefore, it is possible to drive the slidable member in a further smooth manner.

In the foregoing embodiments, the strip-shaped transmission member such as the wire, the belt with teeth and the like is used as the transmission means. The transmission means, however, may be a strip-shaped transmission member such as a length of chain as a matter of course, and it is not always necessary to use the strip-shaped transmission member.

The transmission means may be provided with, for example, a driving gear which rotates integrally with the external gear, and a driven gear which is rotated integrally with the second gear and engaged with the driving gear to absorb the oscillating movement (oscillating component). In this case, even if the driving gear and the driven gear have, for example, general involute gear teeth, it is possible to obtain a sufficient absorption effect of the oscillating component by means of setting a relatively large module, and making the center distance between them longer than a standard by twice as long as the amount of eccentricity ΔE. As a matter of course, technology for making structure insensitive to variation in the center distance by use of a special teeth profile such as transitional teeth and the like is widely known, so that utilization of such technology is effective too.

Since the slidable member being a target to be driven is the automatic door of the building in the foregoing embodiment, the slidable member and the transmission means are independent components from each other. Taking a case that the slidable member itself is a flexible sheet-shaped member such as the automatic curtain, the automatic shutter, and the carrier of the belt conveyer, the slidable member itself, being the target to be driven, may serve as the transmission means. In this case, it is possible to further simplify the whole structure.

In the foregoing embodiment, the planetary gear speed reduction mechanism of the external gear oscillation engagement type, in which the external gear is inscribed in the fixed internal gear with oscillation, is adopted because of especially simplifying the structure for oscillating the external gear and the like. The structure of the planetary gear speed reduction mechanism, however, is not specifically limited to the foregoing structure in the present invention.

For example, a planetary gear speed reduction mechanism of the so-called internal gear oscillation engagement type, in which an internal gear meshes with an external gear with oscillation, may be adopted as the structure of the planetary gear speed reduction mechanism. In this case, the speed reduction output is taken out of the internal gear. Since the internal gear is disposed on the outermost periphery of the speed reduction mechanism in terms of its structure, teeth for constituting part of the transmission means may be formed in the outer periphery of the internal gear. This structure may be effective when further reducing the axial length of the device.

Furthermore, the planetary gear speed reduction mechanism of a distortion engagement type, which has been described in the prior art section, may be adopted as the structure of the planetary gear speed reduction mechanism. In this case, the center of the external gear does not move. A taken part of rotational component, however, is always in a distorted state (in a state of varying a pitch radius), so that a distortion component (an oscillating component in a broad sense) occurs in connection with the rotational component. A situation is similar to the case where the center of the shaft is moved. Thus, the present invention can be applied to the reducer having the planetary gear speed reduction mechanism of the distortion engagement type in the exactly same manner. In the case of the planetary gear speed reduction mechanism of the distortion engagement type, since the external teeth of the external gear themselves have a relatively high teeth profile, (the external teeth of) the external gear can directly serve as the driving gear (or driving sprocket) of the transmission means.

Part of or the whole of the casing may serve as a structure of a host machine into which the reducer is installed, in order to structure the so-called build-in type reducer.

The present invention can be applied to every reducer having the planetary gear speed reduction mechanism of the inner gearing type.

The disclosure of Japanese Patent Application No. 2003-275355 filed Jul. 16, 2003 including specification, drawings and claims is incorporated herein by reference in its entirety.

What is claimed is:

1. A reducer comprising:
    a casing;
    an input shaft; and
    a planetary gear speed reduction mechanism having an internal gear, an external gear which internally meshes with the internal gear, and a swing body which makes one of the internal gear and the external gear rotate on its axis with an oscillating movement in accordance with a rotation of the input shaft, the casing containing the input shaft and the planetary gear speed reduction mechanism, the one of the gears serving as an output shaft or a member integrated with the one of the gears serving as the output shaft, wherein the output shaft carries both a component of the oscillating movement and rotational movement, and wherein the output shaft rotates on its axis to take out a rotation component with the oscillating movement to outside the casing.

2. The reducer according to claim 1, wherein
    the output shaft is not supported by any bearing that is configured to coaxially align the center of the output shaft.

3. The reducer according to claim 1, wherein
    the one of the gears is the external gear, and a through hole is formed along a plane of the casing, the plane being orthogonal to the center of the input shaft.

4. The reducer according to claim 3, wherein
    the internal gear has teeth, a part of the teeth of the internal gear is omitted, and the through hole is formed in the omitted portion.

5. A reducer comprising:
    a casing;
    a first shaft;
    a planetary gear speed reduction mechanism having an internal gear, an external gear which internally meshes with the internal gear, and a swing body which makes one of the internal gear and the external gear rotate on its axis with an oscillating movement in accordance with a rotation of the first shaft, the casing containing the first shaft and the planetary gear speed reduction mechanism;
    a second shaft disposed outside of the casing in parallel with the first shaft; and
    a transmission disposed between the one of the gears and the second shaft, which transmits a rotating movement of the one of the gears to a side of the second shaft and absorbs the oscillating movement of the one of the gears.

6. A reducer comprising:
    a casing;
    a first shaft;
    a planetary gear speed reduction mechanism having an internal gear, an external gear which internally meshes with the internal gear, and a swing body which makes one of the internal gear and the external gear rotate on its axis with an oscillating movement in accordance with a rotation of the first shaft;

a second shaft disposed in parallel with the first shaft; and a transmission disposed between the one of the gears and the second shaft, which transmits a rotating movement of the one of the gears to the second shaft and absorbs the oscillating movement of the one of the gears, the casing containing the first shaft, the planetary gear speed reduction mechanism, the second shaft, and the transmission.

7. The reducer according to any one of claims 1 to 6, wherein a part or the whole of the casing serves as a structure of a host machine, in which the reducer is installed.

8. The reducer according to claim 5 or 6, wherein the transmission comprises:

a driving section rotating integrally with the one of the gears;

a driven section formed in the second shaft; and a strip-shaped transmission member wound between the driving section and the driven section.

9. The reducer according to claim 8, wherein a driving groove section is formed in the one of the gears as the driving section, and the driving groove section rotates integrally with the one of the gears.

10. The reducer according to claim 5 or 6, wherein the transmission comprises:

a driving gear rotating integrally with the one of the gears; and a driven gear disposed in the second shaft, and engaged with the driving gear in such a manner as to enable to absorb the oscillating movement of the one of the gears.

11. A reducer for driving a slidable member moving in a predetermined direction, the reducer comprising:

a first shaft; and a planetary gear speed reduction mechanism having an internal gear, an external gear which internally meshes with the internal gear, and a swing body which makes one of the internal gear and the external gear rotate on its axis with an oscillating movement in accordance with a rotation of the first shaft;

a second shaft disposed in parallel with the first shaft; and a transmission disposed between the one of the gears and the second shaft, which transmits a rotating movement of the one of the gears to a side of the second shaft and absorbs the oscillating movement of the one of the gears, wherein the slidable member is driven in conjunction with a movement of the transmission or a rotation of the second shaft.

12. The reducer according to claim 11, wherein the slidable member being a target to be driven serves as the transmission.

13. A reducer for driving a joint of an industrial robot, said reducer comprising:

a casing:

a first shaft;

a planetary gear speed reduction mechanism having an internal gear, an external gear which internally meshes with the internal gear, and a swing body which makes one of the internal gear and the external gear rotate on its axis with an oscillating movement in accordance with a rotation of the first shaft;

a second shaft disposed in parallel with the first shaft;

a transmission disposed between the one of the gears and the second shaft, which transmits a rotating movement of the one of the gears to the second shaft and absorbs the oscillating movement of the one of the gears, wherein the joint is driven in conjunction with a movement of the transmission or a rotation of said second shaft.

* * * * *